(12) United States Patent
Ohmae et al.

(10) Patent No.: US 12,158,223 B2
(45) Date of Patent: Dec. 3, 2024

(54) CONVERSION ADAPTER AND FITTING WITH THE SAME

(71) Applicant: NIPPON PILLAR PACKING CO., LTD., Osaka (JP)

(72) Inventors: Kiyotaka Ohmae, Osaka (JP); Masashi Katanaya, Osaka (JP); Atsushi Nakano, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 355 days.

(21) Appl. No.: 17/311,478

(22) PCT Filed: May 14, 2019

(86) PCT No.: PCT/JP2019/019078
§ 371 (c)(1),
(2) Date: Jun. 7, 2021

(87) PCT Pub. No.: WO2020/129276
PCT Pub. Date: Jun. 25, 2020

(65) Prior Publication Data
US 2022/0025996 A1  Jan. 27, 2022

(30) Foreign Application Priority Data

Dec. 19, 2018 (JP) .................................. 2018-237301

(51) Int. Cl.
*F16L 19/02* (2006.01)
(52) U.S. Cl.
CPC ....... *F16L 19/0237* (2013.01); *F16L 19/0218* (2013.01)
(58) Field of Classification Search
CPC . F16L 19/0237; F16L 19/0218; F16L 33/223; F16L 19/04; F16L 17/063; F16L 33/224
See application file for complete search history.

(56) References Cited

U.S. PATENT DOCUMENTS 3,891,246 A * 6/1975 Hopper ................. F16L 17/063
285/354
4,033,614 A * 7/1977 Hanson .................. F16L 33/01
285/248
(Continued)

FOREIGN PATENT DOCUMENTS

FR  2129372 A7 * 10/1972
JP  4-56286 U  5/1992
(Continued)

OTHER PUBLICATIONS

International Search Report issued on Jul. 9, 2019 in PCT/JP2019/019078 filed on May 14, 2019, 2 pages.
(Continued)

*Primary Examiner* — Zachary T Dragicevich
*Assistant Examiner* — James A Linford
(74) *Attorney, Agent, or Firm* — Oblon, McClelland, Maier & Neustadt, L.L.P.

(57) ABSTRACT

A first peripheral wall end portion of a conversion adapter is connected to a tubular body across a gasket, and has either an annular protrusion to be pressed into an annular groove on a side surface of the gasket, or an annular groove to allow an annular protrusion projecting from a side surface of the gasket to be pressed thereinto. The first peripheral wall end portion has either an internally threaded portion to allow an externally threaded portion of the tubular body to be screwed thereinto, or an externally threaded portion to allow a nut to be screwed thereonto. The nut also allows an externally threaded portion of the tubular body to be screwed thereinto. A second peripheral wall end portion of the conversion adapter has an externally threaded portion to allow another nut to be screwed thereonto, and then, to allow the sleeve to make contact with the inside.

4 Claims, 8 Drawing Sheets

(56) References Cited

U.S. PATENT DOCUMENTS

| | | | | |
|---|---|---|---|---|
| 6,450,542 | B1* | 9/2002 | McCue | F16L 25/14 |
| | | | | 285/376 |
| 2008/0136175 | A1* | 6/2008 | Hansen | F16L 19/10 |
| | | | | 285/245 |
| 2008/0231049 | A1* | 9/2008 | Schober | F16L 19/0237 |
| | | | | 285/390 |
| 2009/0066081 | A1 | 3/2009 | Katsura | |
| 2010/0201118 | A1 | 8/2010 | Anton et al. | |
| 2010/0320755 | A1 | 12/2010 | Williams et al. | |
| 2013/0270814 | A1 | 10/2013 | Anton et al. | |
| 2015/0252922 | A1 | 9/2015 | Anton et al. | |
| 2017/0159854 | A1 | 6/2017 | Fujii et al. | |
| 2022/0082193 | A1* | 3/2022 | Zheng | F16L 11/12 |

FOREIGN PATENT DOCUMENTS

| | | | | |
|---|---|---|---|---|
| JP | 2006-161873 | A | 6/2006 | |
| JP | 2006-316806 | A | 11/2006 | |
| JP | 2010-532452 | A | 10/2010 | |
| JP | 5883907 | B1 | 3/2016 | |
| KR | 10-1997-0009016 | B1 | 6/1997 | |
| KR | 10-2017-0040341 | A | 4/2017 | |
| WO | WO-0148414 | A1 * | 7/2001 | ............ F16L 19/065 |
| WO | WO-2016052222 | A1 * | 4/2016 | ............ F16L 19/02 |

OTHER PUBLICATIONS

Korean Office Action issued Oct. 27, 2023 in Korean Application 10-2021-7008640, (with English translation), 18 pages.
German Office Action issued in German Patent Application No. 11 2019 006 319.7 on Jul. 31, 2024, (w/ English Translation).

* cited by examiner

CONVERSION ADAPTER AND FITTING WITH THE SAME

TECHNICAL FIELD

The invention relates to fittings and the likes, in particular, those for connection to tubes by using sleeves.

BACKGROUND ART

In semiconductor processing, various liquid chemicals are used for application of resists to wafers, cleaning of wafers, and the like. Piping systems treating such chemicals, such as tubes, fittings, valves, and pumps, are included in production lines of semiconductor devices. Such piping systems are characterized by the following features: All portions to be directly wetted by chemicals are made of fluoropolymers; and maintenance such as cleaning is required at relatively frequent intervals. The former aims at preventing metallic contamination from forming crystal defects of semiconductors and deteriorating electric characteristics thereof. The latter aims at preventing particulates from causing defectively manufactured traces, and aims at preventing organic materials from causing abnormal film formation. In view of these features, the piping systems are required to be easy to assemble and disassemble, as well as to have excellent sealing properties.

A fitting disclosed in Patent Literature 1, for example, uses a sleeve for connection to a tube, thereby maintaining high sealing properties even when it is reconfigured after disassembled. Like a body of the fitting, the sleeve is made of a fluoropolymer. A first peripheral wall end of the sleeve is pressed into an open end of the tube, and a second peripheral wall end of the sleeve forms a sealing structure together with a peripheral wall end of the fitting body. In the sealing structure, for example, the second peripheral wall end of the sleeve includes an annular protrusion axially projecting from the whole circumference, which is pressed into a circumferential, annular groove in the peripheral wall end of the fitting body. Alternatively, the second peripheral wall end of the sleeve may include a circumferential, annular groove, into which an annular protrusion projecting from the whole circumference of the peripheral wall end of the fitting body is pressed. Since the annular protrusion has a radial width slightly larger than the annular groove, the annular protrusion radially presses against and makes contact with the annular groove without any spaces therebetween. As a result, the sealing structure maintains its high sealing properties. When the tube is removed from the fitting, the sleeve is also removed with the tube. This makes removal and reconnection of the tube easier than direct connection of the tube to the fitting body.

CITATION LIST

Patent Literature

Patent Literature 1: JP 5883907 B1

SUMMARY OF INVENTION

An increased number of steps of semiconductor processing complicate the piping systems. Preventing the increasingly complex piping systems from excessively scaling up production lines of semiconductor devices requires further size reduction of the piping systems. One of measures to meet the requirement is an attempt to simplify fittings to connect openings (inlets or outlets) of devices such as pumps, valves, or sensors, as follows. The opening of each device is provided coaxially with a fitting body including an externally threaded portion (a cylindrical structure with a threaded outer periphery.) When one of the externally threaded portions is right-hand, the other is left-hand. Both the externally threaded portions are screwed into a single nut such that a gasket is placed therebetween. This nut includes a right-hand internal thread on one side of its inner periphery and a left-hand internal thread on the other side thereof, thereby allowing both the externally threaded portions of the fittings to be screwed thereinto at the same time. Then, internal spaces of the two externally threaded portions are connected to each other and used as a flow channel between the devices.

This fitting has a simple structure comprised of the two externally threaded portions, the single nut, and the gasket, and thus, its size is easy to reduce. On the other hand, the fitting, when its body has a left-hand external thread, cannot be connected to an existing fitting for connection to a tube since existing fittings generally have right-hand threads.

An object of the invention is to solve the above-mentioned problems, in particular, to provide a conversion adapter that, while maintaining a simple structure of a fitting for connection between devices, can connect the fitting to an existing fitting for connection to a tube and can maintain high sealing properties between the fitting and the existing fitting.

According to a first aspect of the invention, a conversion adapter is a cylindrical member for connecting a tube and a nut to a tubular body of a fitting. The tube includes an open end into which a sleeve is pressed. The nut encloses the sleeve and the tube therein. The conversion adapter includes a first peripheral wall end portion connected to the tubular body across a gasket and a second peripheral wall end portion connected to the sleeve and the nut. The first peripheral wall end portion includes a circumferential, annular groove and an internally threaded portion, and the second peripheral wall end portion includes an externally threaded portion. The annular groove of the first peripheral wall end portion allows an annular protrusion axially projecting from a side surface of the gasket to be pressed thereinto. The internally threaded portion of the first peripheral wall end portion allows an externally threaded portion in a peripheral wall end portion of the tubular body to be screwed thereinto. The externally threaded portion of the second peripheral wall end portion allows the nut to be screwed thereonto.

According to a second aspect of the invention, a conversion adapter is a cylindrical member for connecting a tube and a nut to a tubular body of a fitting. The tube includes an open end into which a sleeve is pressed. The nut encloses the sleeve and the tube therein. The conversion adapter includes a first peripheral wall end portion connected to the tubular body across a gasket and a second peripheral wall end portion connected to the sleeve and the nut. The first peripheral wall end portion includes an annular protrusion axially projecting and an internally threaded portion, and the second peripheral wall end portion includes an externally threaded portion. The annular protrusion of the first peripheral wall end portion is pressed into a circumferential, annular groove on a side surface of the gasket. The internally threaded portion of the first peripheral wall end portion allows an externally threaded portion in a peripheral wall end portion of the tubular body to be screwed thereinto. The externally threaded portion of the second peripheral wall end portion allows the nut to be screwed thereonto.

According to a third aspect of the invention, a conversion adapter is a cylindrical member for connecting a tube and a nut to a tubular body of a fitting. The tube includes an open end into which a sleeve is pressed. The nut encloses the sleeve and the tube therein. The conversion adapter includes a first peripheral wall end portion connected to the tubular body across a gasket and a second peripheral wall end portion connected to the sleeve and the nut. The first peripheral wall end portion includes a circumferential, annular groove and an externally threaded portion, and the second peripheral wall end portion includes an externally threaded portion. The annular groove of the first peripheral wall end portion allows an annular protrusion axially projecting from a side surface of the gasket to be pressed thereinto. The externally threaded portion of the first peripheral wall end portion allows an intermediate nut to be screwed thereonto. The intermediate nut is also screwed onto an externally threaded portion in a peripheral wall end portion of the tubular body. The externally threaded portion of the second peripheral wall end portion allows the nut to be screwed thereonto.

According to a fourth aspect of the invention, a conversion adapter is a cylindrical member for connecting a tube and a nut to a tubular body of a fitting. The tube includes an open end into which a sleeve is pressed. The nut encloses the sleeve and the tube therein. The conversion adapter includes a first peripheral wall end portion connected to the tubular body across a gasket and a second peripheral wall end portion connected to the sleeve and the nut. The first peripheral wall end portion includes an annular protrusion axially projecting and an externally threaded portion, and the second peripheral wall end portion includes an externally threaded portion. The annular protrusion of the first peripheral wall end portion is pressed into a circumferential, annular groove on a side surface of the gasket. The externally threaded portion of the first peripheral wall end portion allows an intermediate nut to be screwed thereonto. The intermediate nut is also screwed onto an externally threaded portion in a peripheral wall end portion of the tubular body. The externally threaded portion of the second peripheral wall end portion allows the nut to be screwed thereonto.

The second peripheral wall end portion may include a circumferential, annular groove, which allows an annular protrusion axially projecting from a peripheral wall end portion of the sleeve to be pressed thereinto.

According to an aspect of the invention, a fitting for connecting a tube to an opening portion of a device includes, in addition to the conversion adapter according to one of the above-mentioned first to fourth aspects of the invention, a tubular body, a gasket, a sleeve, and a nut. The tubular body is provided coaxially around the opening portion of the device. The gasket is located at a peripheral wall end portion of the tubular body. The conversion adapter includes the first peripheral wall end portion connected to the tubular body across the gasket and the second peripheral wall end portion having the externally threaded portion. The sleeve includes a first peripheral wall end portion connected to the second peripheral wall end portion of the conversion adapter and a second peripheral wall end portion pressed into an open end of the tube. The nut allows the tube to be inserted thereinto, and allows the externally threaded portion of the conversion adapter to be screwed thereinto.

In the above-mentioned conversion adapter according to the invention, the annular protrusion of the first peripheral wall end portion is pressed into the annular groove of the gasket, or the annular groove of the first peripheral wall end portion allows the annular protrusion of the gasket to be pressed thereinto. In addition, the internally threaded portion of the first peripheral wall end portion allows the externally threaded portion of the tubular body of the fitting to be screwed thereinto, or the externally threaded portion of the first peripheral wall end portion and the externally threaded portion of the tubular body are screwed into the intermediate nut. Accordingly, regardless of whether the externally threaded portion of the tubular body is right- or left-hand, the conversion adapter can be connected to both the externally threaded portion of the tubular body and the nut. Thus, the conversion adapter, while maintaining a simple structure of a fitting for connection between devices, can connect the fitting to an existing fitting for connection to a tube and maintain high sealing properties between the fitting and the existing fitting.

DESCRIPTION OF EMBODIMENTS

The following explains embodiments of the invention with reference to the drawings.

[Connection Between Device Units]

Figure 1A:
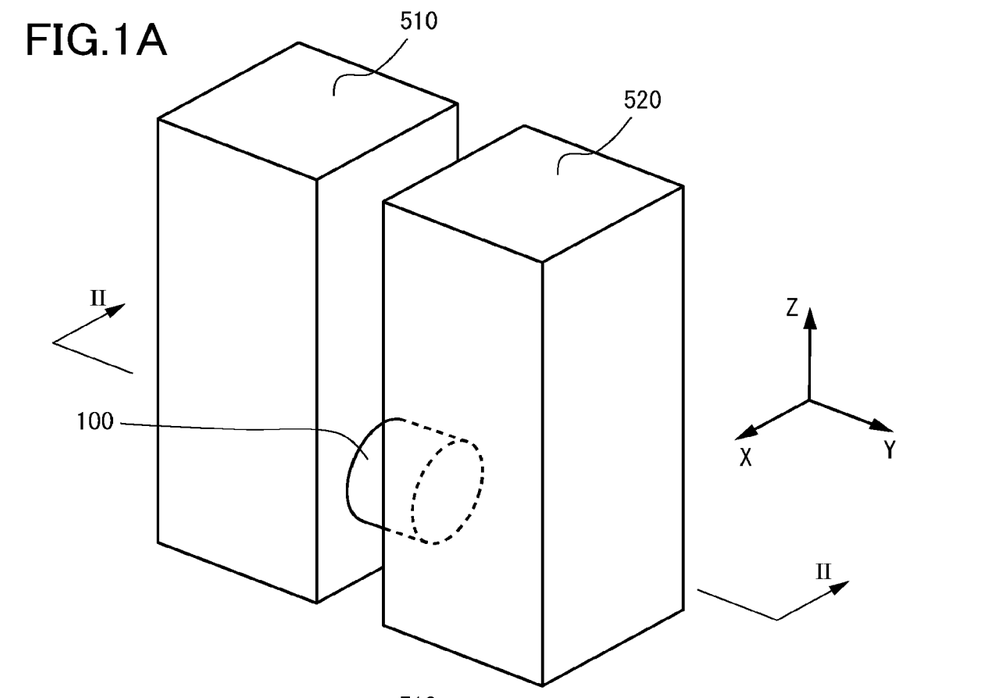
FIG. 1A is a perspective view showing an appearance of two device units connected to each other.
Figure 1B:
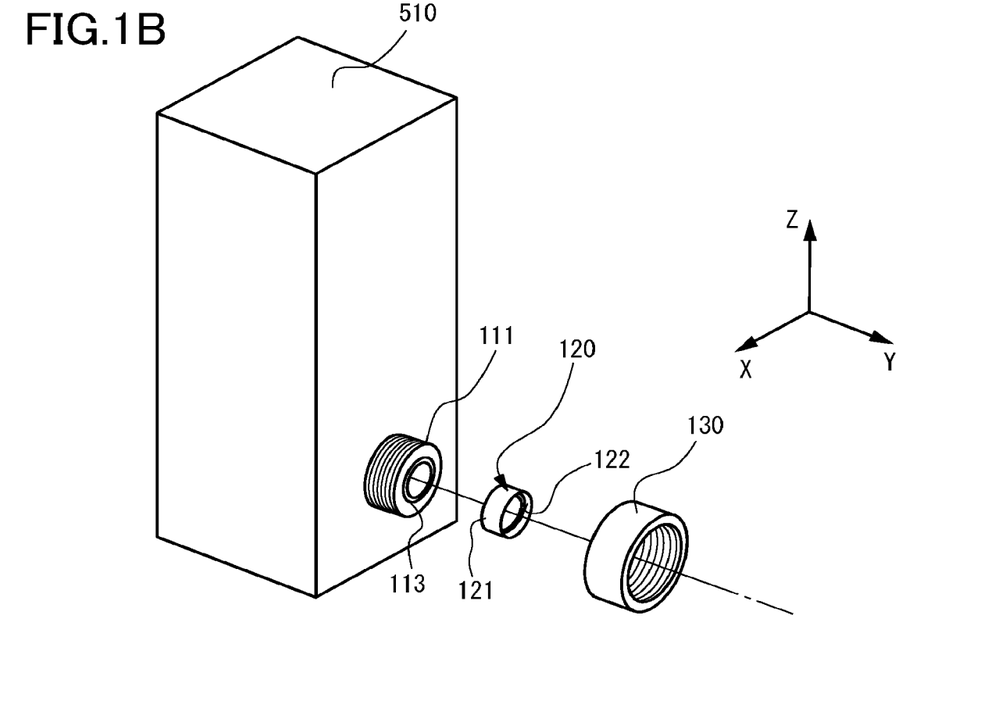
FIG. 1B is an exploded view of a fitting connecting the device units in FIG. 1A.
Figure 2:
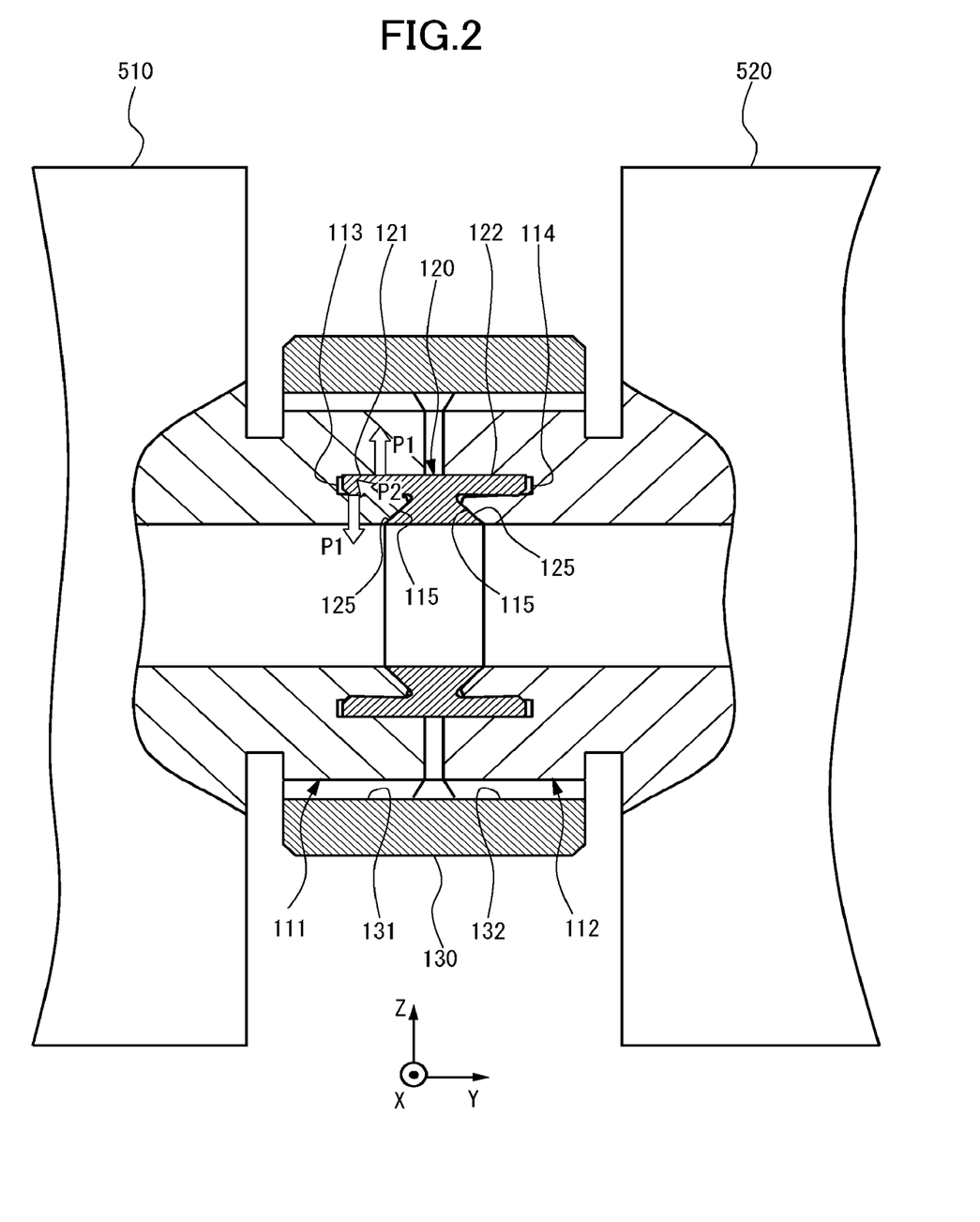
FIG. 2 is a vertical cross-section view along a line II-II in FIG. 1A.

FIG. 1A is a perspective view showing an appearance of two device units connected to each other, and FIG. 1B is an exploded view of a fitting 100 connecting these device units. FIG. 2 is a vertical cross-section view along a line II-II in FIG. 1A. For example, one of the device units is a flowmeter 510, and the other is a valve 520. The fitting 100 is located, for example, between an outlet of the flowmeter 510 and an inlet of the valve 520. The fitting 100 includes a tubular body 111 on the flowmeter 510, a tubular body 112 on the valve 520, a gasket 120, and a common nut 130.

Each of the tubular bodies 111 and 112 is a cylindrical member made of a fluoropolymer such as polytetrafluoroethylene (PTFE) or perfluoroalkoxy alkane (PFA), which has an axial length shorter than the common nut 130. The tubular bodies 111 and 112 each include an externally threaded portion, which is a cylindrical portion with a threaded outer periphery. One 111 of the tubular bodies is provided coaxially at the outlet of the flowmeter 510, and the other 112 is provided coaxially at the inlet of the valve 520. The tubular body 111 on the flowmeter 510 and the tubular body 112 on the valve 520 have the same shape and size, but one of their externally threaded portions is right-hand, and the other is left-hand. Peripheral wall end portions of the tubular bodies 111 and 112 have circumferential, annular grooves 113 and 114, respectively.

The gasket 120 is an annular member made of a fluoropolymer such as PTFE or PFA, which is arranged coaxially with the tubular bodies 111 and 112. The gasket 120 has an inner diameter equal to or slightly larger than inner diameters of the tubular bodies 111 and 112. The gasket 120 has an outer diameter slightly larger than outer diameters of the annular grooves 113 and 114 of the tubular bodies 111 and 112. The gasket 120 is placed between peripheral wall end portions of the two tubular bodies 111 and 112. That is, one side surface of the gasket 120 is connected to the peripheral wall end portion of the tubular body 111 on the flowmeter 510, and the other is connected to the peripheral wall end portion of the tubular body 112 on the valve 520. The side surfaces of the gasket 120 include their respective annular protrusions 121 and 122, which project axially (in a Y-axis direction in the drawings) from a radially central portion of the gasket 120 to be pressed into the annular grooves 113 and 114 of the tubular bodies 111 and 112.

The common nut 130 is a cylindrical member made of a fluoropolymer such as PTFE, PFA, or polyvinylidene fluoride (PVDF), which is arranged coaxially with the tubular bodies 111 and 112. The common nut 130 has an inner diameter equal to outer diameters of the tubular bodies 111 and 112. As shown in FIG. 2, the common nut 130 includes a first internally threaded portion 131 and a second internally threaded portion 132, which are cylindrical portions with threaded inner peripheries. The first internally threaded portion 131 is engaged with the externally threaded portion of the tubular body 111 on the flowmeter 510, and the second internally threaded portion 132 is engaged with the externally threaded portion of the tubular body 112 on the valve 520. Between the two device units 510 and 520 to be connected to each other, in general, one of the tubular bodies 111 and 112 is right-hand and the other is left-hand, and one of the internally threaded portions 131 and 132 of the common nut 130 is right-hand and the other is left-hand. For example, when the externally threaded portion of the tubular body 111 on the flowmeter 510 is right-hand, the externally threaded portion of the tubular body 112 on the valve 520 is left-hand, the first internally threaded portion 131 of the common nut 130 is right-hand, and the second internally threaded portion 132 of the common nut 130 is left-hand. Accordingly, the common nut 130 can be screwed onto both the externally threaded portions of the tubular bodies 111 and 112 at the same time. That is, the externally threaded portion of the tubular body 111 on the flowmeter 510 is screwed into one side of the common nut 130, and at the same time, the externally threaded portion of the tubular body 112 on the valve 520 is screwed into the opposite side of the common nut 130. Thus, the single common nut 130 connects the two tubular bodies 111 and 112 with the gasket 120 placed therebetween.

—Sealing Structure Between Tubular Bodies and Gasket—

The two tubular bodies 111, 112 and the gasket 120 form a sealing structure, in which the annular protrusions 121 and 122 from both the side surfaces of the gasket 120 are pressed into the annular grooves 113 and 114 of the tubular bodies 111 and 112. Since radial widths of the annular protrusions 121 and 122 are slightly larger than those of the annular grooves 113 and 114, radial pressure P1 is applied from outer and inner peripheries of the annular protrusions 121 and 122 to outer and inner peripheries of the annular grooves 113 and 114, respectively. This causes the outer and inner peripheries of the annular protrusions 121 and 122 to press against and make contact with the outer and inner peripheries of the annular grooves 113 and 114 without any spaces therebetween.

In this sealing structure, furthermore, each peripheral wall end portion of the tubular bodies 111 and 112 includes a tapered surface 115, and each side surface of the gasket 120 includes a tapered surface 125. Each tapered surface 115 of the tubular bodies 111 and 112 is located radially inside the annular groove 113 or 114 and inclined from an axial direction of the tubular bodies 111 and 112 (the Y-axis direction) to have larger diameters at larger distances from a proximal end of the tapered surface 115 in the axial direction (the Y-axis direction). Each tapered surface 125 of the gasket 120 is located radially inside the annular protrusion 121 or 122 and inclined from an axial direction of the gasket 120 (the Y-axis direction) to have smaller diameters at larger distances from a proximal end of the tapered surface 125 in the axial direction (the Y-axis direction). Under the conditions where the common nut 130 is screwed onto the tubular bodies 111 and 112, the tapered surfaces 115 of the tubular bodies 111, 112 and the tapered surfaces 125 of the gasket 120 have the same inclination. In addition, pressure P2 is applied from the entirety of the tapered surfaces 125 of the gasket 120 to the entirety of the tapered surfaces 115 of the tubular bodies 111 and 112, and thus, all the tapered surfaces 125 and 115 press against and make contact with each other without any spaces therebetween. This tightly seals spaces between the tubular bodies 111, 112 and the gasket 120.

[Connection Between Device Unit and Tube]

Figure 3A:
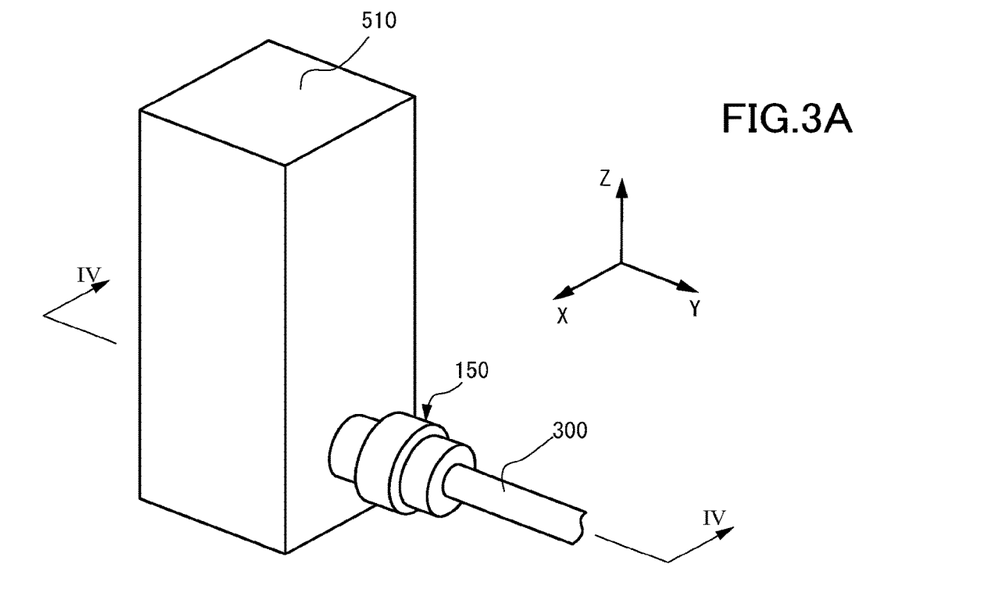
FIG. 3A is a perspective view showing an appearance of a fitting connecting a tube to an outlet of a flowmeter.
Figure 3B:
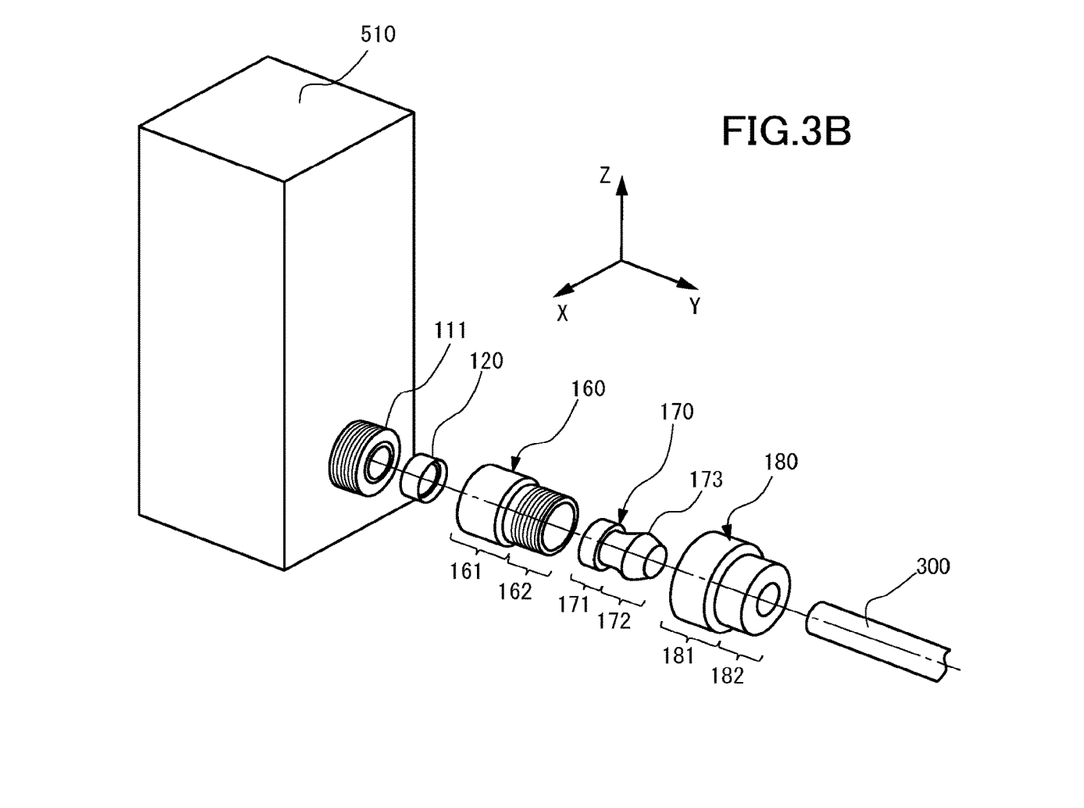
FIG. 3B is an exploded view of the fitting in FIG. 3A.

FIG. 3A is a perspective view showing an appearance of a fitting 150 connecting a tube 300 to the outlet of the flowmeter 510, and FIG. 3B is an exploded view of this fitting 150. The tube 300 is a white or translucent tube made of a fluoropolymer such as PTFE or PFA. The fitting 150 includes, in addition to the above-described tubular body 111 and the gasket 120, a conversion adapter 160, a sleeve 170, and a nut 180.

The conversion adapter 160 is a cylindrical member made of a fluoropolymer such as PTFE or PFA, which is arranged coaxially with the tubular body 111 and includes a first peripheral wall end portion 161 and a second peripheral wall end portion 162. The first peripheral wall end portion 161 is a portion to be connected to the tubular body 111 across the gasket 120. An inner diameter of the first peripheral wall end portion 161 is equal to an outer diameter of the tubular body 111. The first peripheral wall end portion 161 includes an internally threaded portion 167 (cf. FIG. 4), which extends toward an axial direction (the Y-axis direction) and allows the externally threaded portion of the tubular body 111 to be screwed thereinto. The second peripheral wall end portion 162 is a portion to be connected to the sleeve 170 and the nut 180, whose inner diameter is larger than an outer diameter of the sleeve 170, and whose outer diameter is equal to an inner diameter of the nut 180. The second peripheral wall end portion 162 includes an externally threaded portion 168 (cf. FIG. 4), which extends toward the axial direction (the Y-axis direction). When the nut 180 is screwed onto the externally threaded portion 168, the sleeve 170 and an end of the tube 300 are placed inside the externally threaded portion 168.

The sleeve 170 is a cylindrical member made of a fluoropolymer such as PTFE or PFA, which is arranged coaxially with the tubular body 111 and has the same inner diameter as the gasket 120. The sleeve 170 includes a first peripheral wall end portion 171 and a second peripheral wall end portion 172. The first peripheral wall end portion 171 is a portion to be connected to the second peripheral wall end portion 162 of the conversion adapter 160. The second peripheral wall end portion 172 is a portion to be connected to the tube 300 and includes a bulge portion 173, which has outer diameters gently varying with locations in an axial direction of the sleeve 170 (the Y-axis direction) and a portion of the maximum diameter (a peak) in an axially central portion of the second peripheral wall end portion 172. Since the peak has an outer diameter larger than the inner diameter of the tube 300, the bulge portion 173, by pressed into the open end of the tube 300, expands the open end from the inside. Elastomeric forces of the tube 300 that resist the expansion cause the open end of the tube 300 to enclose the bulge portion 173 of the sleeve 170 so that the open end is firmly fixed to the sleeve 170.

The nut 180 is a cylindrical member made of a fluoropolymer such as PTFE, PFA, or PVDF, which is arranged coaxially with the tubular body 111. The nut 180 has two different outer diameters; sections of the nut 180 at larger distances from the tubular body 111 in the axial direction (the positive Y-axis direction) have smaller inner diameters. Accordingly, the nut 180 is divided into a first section 181 and a second section 182. The first section 181 nearer to the tubular body 111 includes an internally threaded portion (not shown in drawings) which extends axially toward the tubular body 111 (in a negative Y-axis direction). When the externally threaded portion of the second peripheral wall end portion 162 of the conversion adapter 160 is screwed into the internally threaded portion of the nut 180, the sleeve 170 is placed inside the nut 180. The second section 182 farther from the tubular body 111 is a portion into which an open end of the tube 300 is inserted, and whose inner diameter is equal to or slightly larger than an outer diameter of the tube 300.

—Sealing Structure formed by Conversion Adapter—

Figure 4:
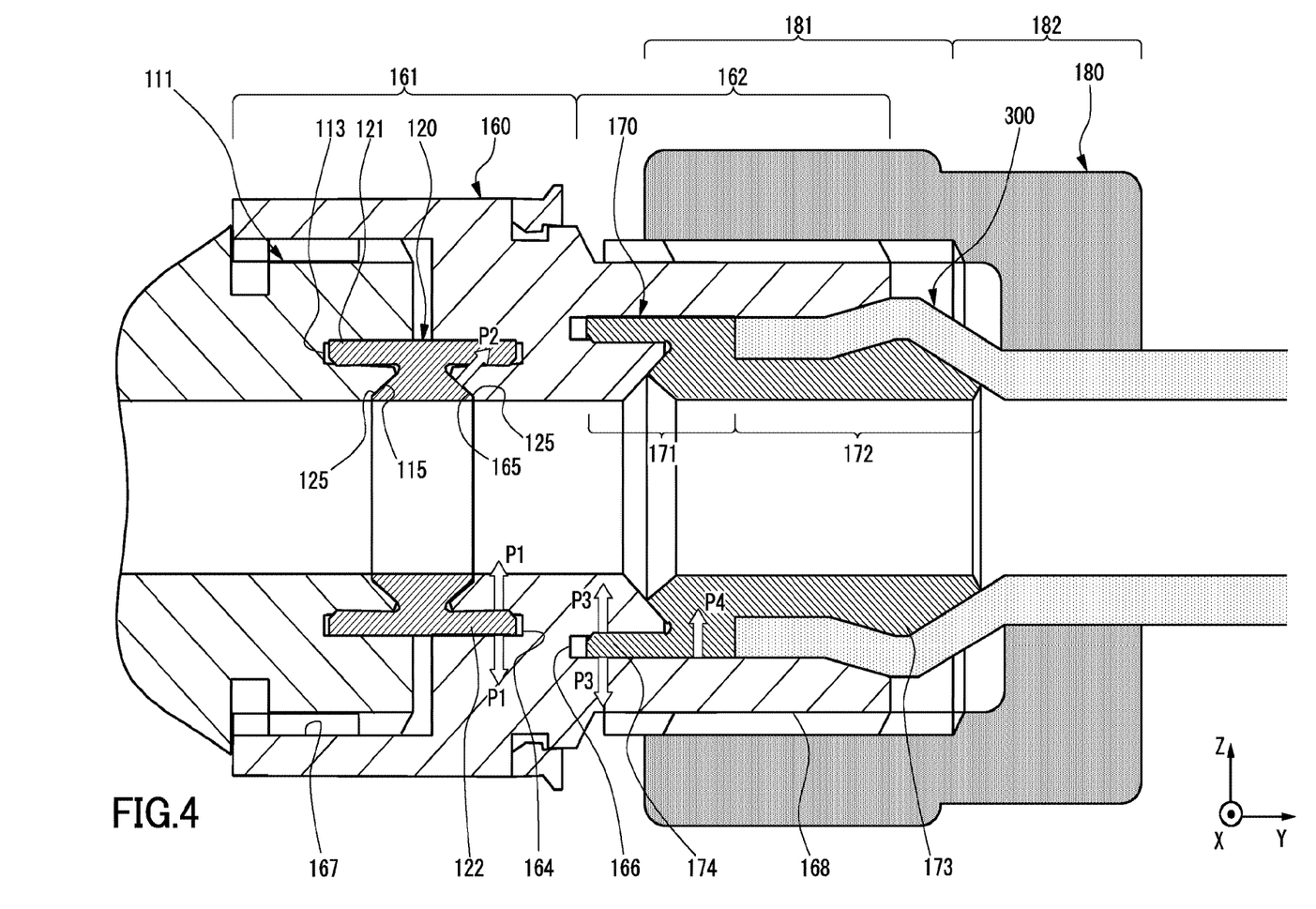
FIG. 4 is a vertical cross-section view along a line IV-IV in FIG. 3A.

FIG. 4 is a vertical cross-section view along a line IV-IV in FIG. 3A. Of the conversion adapter 160, the internally threaded portion 167 of the first peripheral wall end portion 161 is engaged with the externally threaded portion of the tubular body 111, and the externally threaded portion 168 of the second peripheral wall end portion 162 is engaged with the internally threaded portion of the nut 180. The presence of the conversion adapter 160 between the tubular body 111 and the nut 180 enables the nut 180 normally with a right-hand thread to be connected to the tubular body 111 regardless of whether the externally threaded portion of the tubular body 111 is right- or left-hand.

The first peripheral wall end portion 161 of the conversion adapter 160 forms a sealing structure, together with the tubular body 111, with the gasket 120 placed therebetween. As clear from comparison of FIG. 4 with FIG. 2, this sealing structure is similar to the sealing structure between the tubular bodies 111 and 112. That is, the first peripheral wall end portion 161 of the conversion adapter 160 includes an annular groove 164 similar to the annular groove 114 of the tubular body 112, which allows the annular protrusion 122 of the gasket 120 to be pressed thereinto. Since the annular protrusion 122 has a radial width slightly larger than the annular groove 164, radial pressure P1 is applied from outer and inner peripheries of the annular protrusion 122 to outer and inner peripheries of the annular groove 164. This causes the outer and inner peripheries of the annular protrusion 122 to press against and make contact with the outer and inner peripheries of the annular groove 164 without any spaces therebetween.

The first peripheral wall end portion 161 of the conversion adapter 160 further includes a tapered surface 165 similar to the tapered surface 115 of the tubular body 112, which is located radially inside the annular groove 164 and inclined from the axial direction (the Y-axis direction) to have smaller diameters at larger distances from the tubular body 111 in the axial direction (the positive Y-axis direction). Under the conditions where the externally threaded portion of the tubular body 111 is screwed into the internally threaded portion 167 of the first peripheral wall end portion 161, the tapered surface 165 of the first peripheral wall end portion 161 and the tapered surface 125 of the gasket 120 have the same inclination. In addition, pressure P2 is applied from the entirety of the tapered surface 125 of the gasket 120 to the entirety of the tapered surface 165 of the first peripheral wall end portion 161, and thus, both the tapered surfaces 125 and 165 press against and make contact with each other without any spaces therebetween. This tightly seals spaces between the gasket 120 and the conversion adapter 160.

The second peripheral wall end portion 162 of the conversion adapter 160 forms a sealing structure inside the externally threaded portion 168 together with the sleeve 170. The second peripheral wall end portion 162 includes a circumferential, annular groove 166 radially inside the externally threaded portion 168. On the other hand, the sleeve 170 includes an annular protrusion 174 in its first peripheral wall end portion 171, which projects from the whole circumference of the first peripheral wall end portion 171 axially (toward the negative Y-axis direction in drawings) to be pressed into the annular groove 166 of the second peripheral wall end portion 162 when the externally threaded portion 168 of the second peripheral wall end portion 162 is screwed into the nut 180. Since the annular protrusion 174 has a radial width slightly larger than the annular groove 166, radial pressure P3 is applied from outer and inner peripheries of the annular protrusion 174 to outer and inner peripheries of the annular groove 166, and thus, the outer and inner peripheries of the annular protrusion 174 press against and make contact with the outer and inner peripheries of the annular groove 166 without any spaces therebetween. This tightly seals spaces between the conversion adapter 160 and the sleeve 170.

As shown in FIG. 4, the second peripheral wall end portion 162 of the conversion adapter 160 projects axially (in the Y-axis direction) from the first peripheral wall end portion 161 thereof. The externally threaded portion 168 of the second peripheral wall end portion 162 is engaged with the internally threaded portion of the nut 180, while the inner periphery of the second peripheral wall end portion 162 is in contact with the sleeve 170. Since the inner diameter of the externally threaded portion 168 is slightly smaller than the outer diameter of the sleeve 170, the inner periphery of the externally threaded portion 168 applies radial pressure P4 to the outer periphery of the first peripheral wall end portion 171 of the sleeve 170. Thus, the externally threaded portion 168 firmly holds the sleeve 170.

Advantages of Embodiment

In the conversion adapter 160 according to the above-described embodiment of the invention, the annular groove 164 of the first peripheral wall end portion 161 allows the annular protrusion 122 of the gasket 120 to be pressed thereinto, and the internally threaded portion 167 of the first peripheral wall end portion 161 allows the externally threaded portion of the tubular body 111 to be screwed thereinto. On the other hand, the annular groove 166 of the second peripheral wall end portion 162 allows the annular protrusion 174 of the sleeve 170 to be pressed thereinto, and the externally threaded portion 168 of the second peripheral wall end portion 162 allows the nut 180 to be screwed thereonto, and the inner periphery of the second peripheral wall end portion 162 allows the sleeve 170 to make contact therewith. Accordingly, regardless of whether the externally threaded portion of the tubular body 111 is right- or left-hand, the conversion adapter 160 can be connected to both the tubular body 111 and the nut 180. Thus, the conversion adapter 160, while maintaining the simple structure of the fitting 100 for connection between the device units 510 and 520, can connect the fitting 100 to the existing sleeve 170 and nut 180 for connection to the tube 300, and in addition, to maintain high sealing properties for spaces among the fitting 100, the sleeve 170, and the nut 180.

[Modifications]

(1) The conversion adapter 160 according to the above-described embodiment of the invention enables the fitting 100 for connection between the flowmeter 510 and the valve 520 to be also used as the fitting 150 for connection between the flowmeter 510 and the tube 300. Such usage of fittings is possible for other device units such as pumps.

(2) Under the conditions where the tubular bodies 111 and 112 are separated from the common nut 130, the tapered surfaces 115 of the tubular bodies 111, 112 and the tapered surfaces 125 of the gasket 120 may have the same inclination or different inclination angles. As shown in FIG. 2, under the conditions where the common nut 130 is screwed onto the tubular bodies 111 and 112, pressure P2 is applied from the tapered surfaces 125 of the gasket 120 to the tapered surfaces 115 of the tubular bodies 111 and 112, and thus, both the tapered surfaces 115 and 125 press against and make contact with each other without any spaces therebetween, and have the same inclination.

(3) Under the conditions where the conversion adapter 160 is separated from the tubular body 111, the tapered surface 125 of the gasket 120 and the tapered surface 165 of the first peripheral wall end portion 161 of the conversion adapter 160 may have the same inclination or different inclination angles. As shown in FIG. 4, under the conditions where the externally threaded portion of the tubular body 111 is screwed into the internally threaded portion 167 of the first peripheral wall end portion 161, pressure P2 is applied from the tapered surface 125 of the gasket 120 to the tapered surface 165 of the first peripheral wall end portion 161, and thus, both the tapered surfaces 125 and 165 press against and make contact with each other without any spaces therebetween, and have the same inclination.

(4) The conversion adapter 160 in FIGS. 3 and 4 is directly connected to the tubular body 111 by engagement of the internally threaded portion 167 of the first peripheral wall end portion 161 with the externally threaded portion of the tubular body 111. Alternatively, the conversion adapter may be designed to be connected to the tubular body 111 across a nut, as described below.

Figure 5:
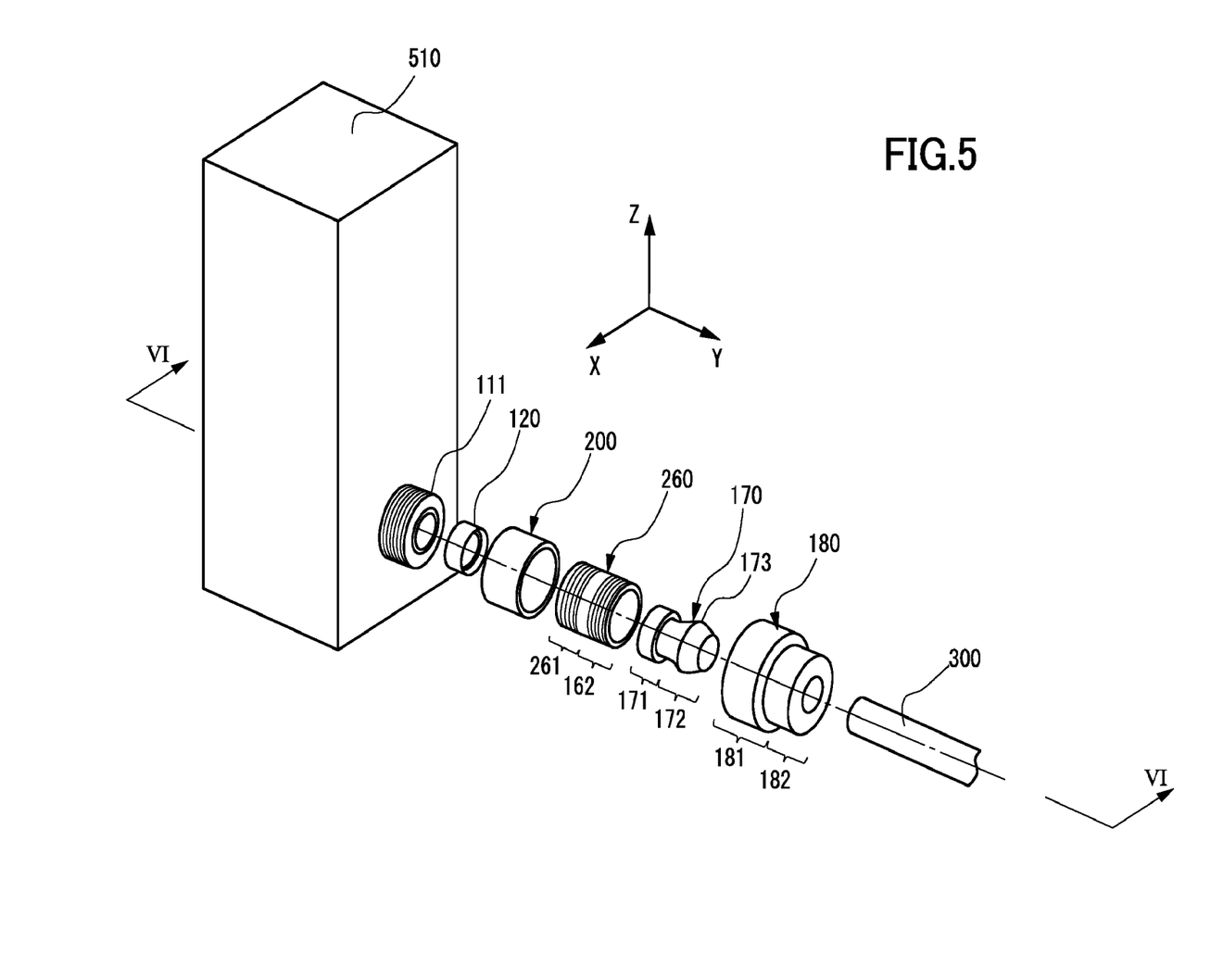
FIG. 5 is an exploded view of a modification of the fitting connecting the tube to the outlet of the flowmeter.
Figure 6:
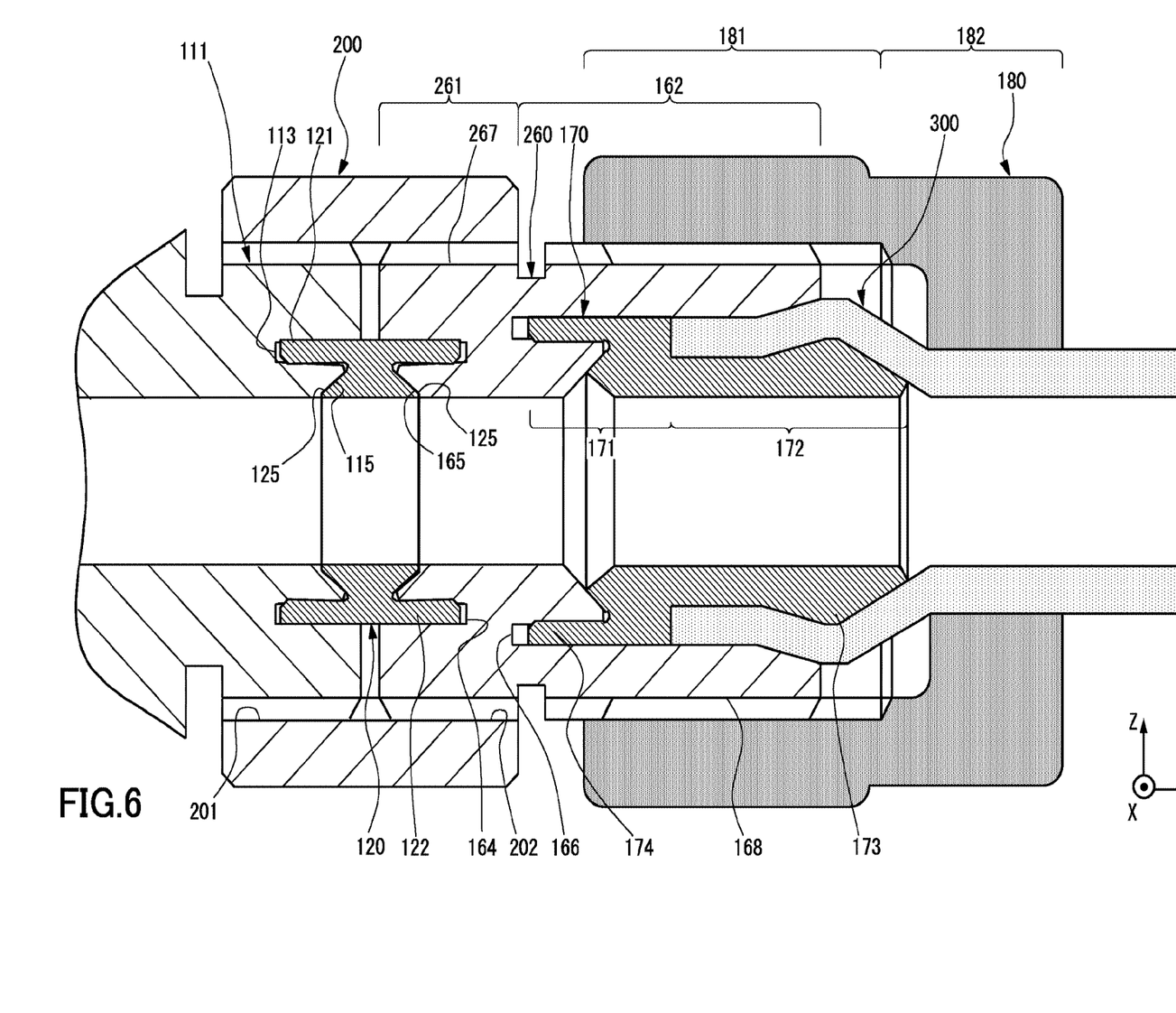
FIG. 6 is a vertical cross-section view along a line VI-VI in FIG. 5.

FIG. 5 is an exploded view of a modification of the fitting connecting the tube 300 to the outlet of the flowmeter 510. FIG. 6 is a vertical cross-section view along a line VI-VI in FIG. 5. This fitting is different from the fitting 150 in FIGS. 3 and 4 in the following two points. First, the conversion adapter 160 has a first peripheral wall end portion 261 in a different shape, in particular, an externally threaded portion 267 instead of the internally threaded portion 167. Second, an intermediate nut 200 is added to the conversion adapter 160. Other components are similar to components of the fitting 150 in FIGS. 3 and 4. In FIGS. 5 and 6, these similar components are marked by the same reference numbers as those in FIGS. 3 and 4. On details of the similar components, the explanation on the above-described embodiment should be referred to.

The conversion adapter 260 is a cylindrical member made of a fluoropolymer such as PTFE or PFA, which is arranged coaxially with the tubular body 111. This conversion adapter 260, in contrast to the conversion adapter 160 in FIGS. 3 and 4, has a different first peripheral wall end portion 261, which is a portion connected to the tubular body 111 across the gasket 120. The first peripheral wall end portion 261 has an outer diameter equal to that of the tubular body 111. The first peripheral wall end portion 261 has the externally threaded portion 267, which extends axially (in the Y-axis direction) and allows the intermediate nut 200 to be screwed thereonto.

The intermediate nut 200 is a cylindrical member made of a fluoropolymer such as PTFE, PFA, or PVDF, which is arranged coaxially with the tubular body 111. The intermediate nut 200 has an inner diameter equal to the outer diameter of the tubular body 111. The intermediate nut 200 includes a first internally threaded portion 201 and a second internally threaded portion 202, which are cylindrical portions with threaded inner peripheries. The first internally threaded portion 201 is engaged with the externally threaded portion of the tubular body 111, and the second internally threaded portion 202 is engaged with the externally threaded portion 267 of the first peripheral wall end portion 261 of the conversion adapter 260. For example, when the externally threaded portion of the tubular body 111 is right-hand, the externally threaded portion 267 of the first peripheral wall end portion 261 is left-hand, the first internally threaded portion 201 of the intermediate nut 200 is right-hand, and the second internally threaded portion 202 of the intermediate nut 200 is left-hand. Accordingly, the intermediate nut 200 can be screwed onto both the externally threaded portions of the tubular body 111 and the first peripheral wall end portion 261 at the same time. That is, the externally threaded portion of the tubular body 111 is screwed into one side of the intermediate nut 200, and at the same time, the externally threaded portion 267 of the first peripheral wall end portion 261 is screwed into the opposite side of the intermediate nut 200. Thus, the intermediate nut 200 connects the tubular body 111 to the first peripheral wall end portion 261 across the gasket 120. In contrast to the structure in FIGS. 3 and 4, the conversion adapter 260 cannot rotate around the axis of the gasket 120. This can prevent damages such as abrasion caused by rotational sliding of the conversion adapter 260.

(5) In the sealing structure between the device units 510 and 520 according to the above-described embodiment of the invention, the tubular bodies 111 and 112 of the fitting include the annular grooves 113 and 114 on the peripheral wall end portions, and the gasket 120 includes the annular protrusions 121 on the side surfaces. Reversely, the tubular bodies of the fittings may include annular protrusions and the gasket may include annular grooves. In this case, the conversion adapter may also include an annular protrusion on the first peripheral wall end portion.

Figure 7:
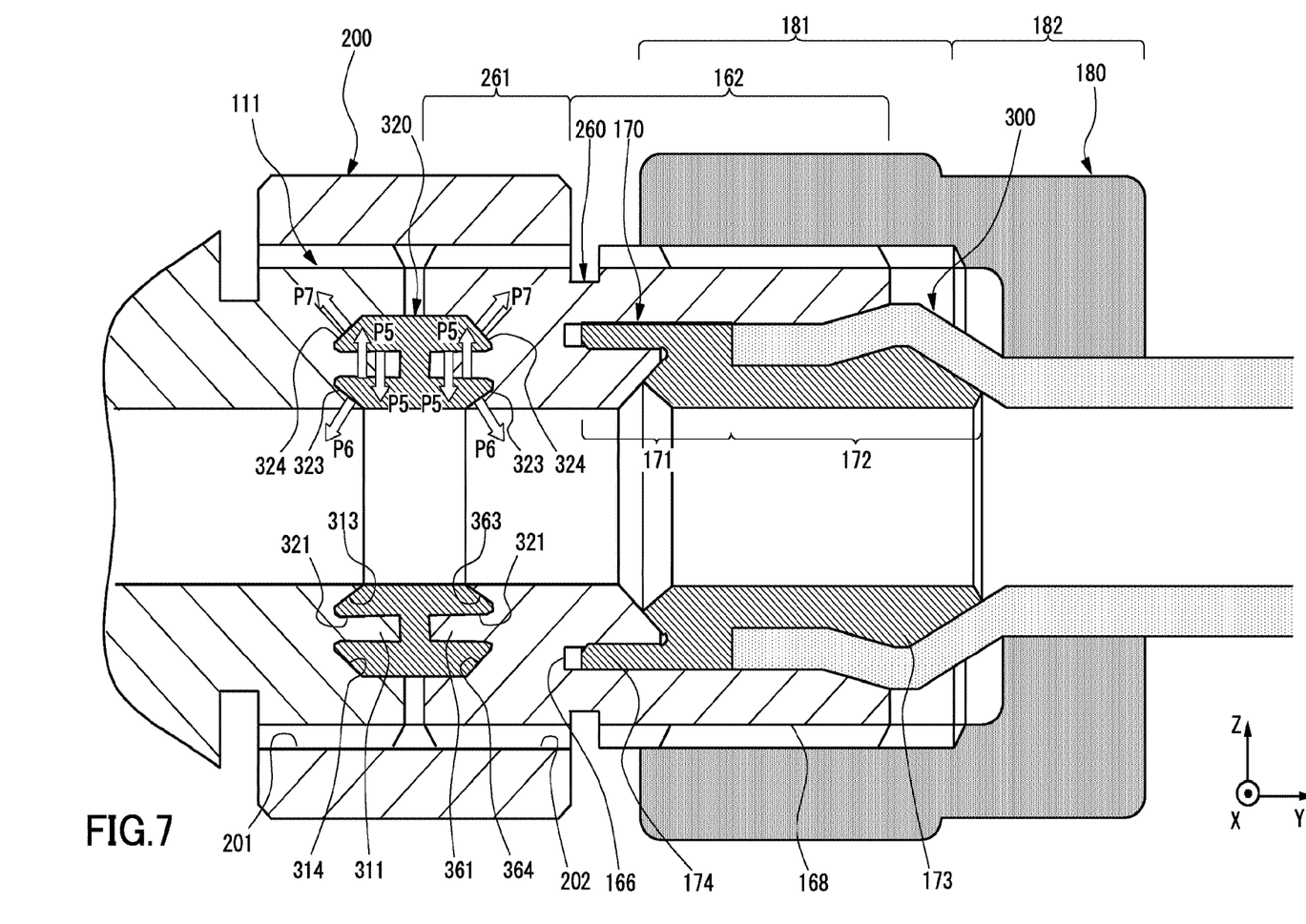
FIG. 7 is a vertical cross-section view of a modification of the sealing structure between a tubular body of the fitting and a conversion adapter shown in FIG. 6.

FIG. 7 is a vertical cross-section view of a modification of the sealing structure between the tubular body 111 of the fitting and the conversion adapter 260 shown in FIG. 6. The tubular body 111 includes an annular protrusion 311 projecting from the whole circumference of a peripheral wall end portion toward an axial direction (the positive Y-axis direction). Similarly, the first peripheral wall end portion 261 of the conversion adapter 260 includes an annular protrusion 361 projecting from the whole circumference toward an axial direction (the negative Y-axis direction). On the other hand, the gasket 320 includes a circumferential, annular groove 321 on each side surface. The annular protrusions 311, 361 are pressed into the annular grooves 321. Since the annular protrusions 311, 361 have radial widths slightly larger than the annular grooves 321, radial pressure P5 is applied from outer and inner peripheries of the annular grooves 321 to outer and inner peripheries of the annular protrusions 311, 361. Thus, the outer and inner peripheries of the annular grooves 321 press against and make contact with the outer and inner peripheries of the annular protrusions 311, 361 without any spaces therebetween.

In this sealing structure, furthermore, the peripheral wall end portion of the tubular body 111 includes a first tapered surface 313 and a second tapered surface 314. Similarly, the first peripheral wall end portion 261 of the conversion adapter 260 includes a first tapered surface 363 and a second tapered surface 364. On the other hand, the side surfaces of the gasket 320 include a first tapered surface 323 and a second tapered surface 324.

The first tapered surface 313 of the tubular body 111 is located radially inside the annular protrusion 311 and inclined from an axial direction of the tubular body 111 (the Y-axis direction) to have smaller diameters at larger distances from a proximal end of the first tapered surface 313 in the axial direction (the positive Y-axis direction). The second tapered surface 314 of the tubular body 111 is located radially outside the annular protrusion 311 and inclined from the axial direction of the tubular body 111 (the Y-axis direction) to have larger diameters at larger distances from a proximal end of the second tapered surface 314 in the axial direction (the positive Y-axis direction).

The annular protrusion 361 and the tapered surfaces 363, 364 of the first peripheral wall end portion 261 of the conversion adapter 260 have shapes corresponding to those of the annular protrusion 311 and the tapered surfaces 313, 314 of the tubular body 111 as if the former shapes were mirror images of the latter shapes. In other words, the first tapered surface 363 of the first peripheral wall end portion 261 is located radially inside the annular protrusion 361 and inclined from an axial direction of the tubular body 111 (the Y-axis direction) to have larger diameters at larger distances from the tubular body 111 in the axial direction (the positive Y-axis direction). The second tapered surface 364 of the first peripheral wall end portion 261 is located radially outside the annular protrusion 361 and inclined from the axial direction of the tubular body 111 (the Y-axis direction) to have smaller diameters at larger distances from the tubular body 111 in the axial direction (the positive Y-axis direction).

The first tapered surface 323 of the gasket 320 is located radially inside the annular groove 321 and inclined from an axial direction of the gasket 320 (the Y-axis direction) to have larger diameters at larger distances from a proximal end of the first tapered surface 323 in the axial direction (the Y-axis direction). The second tapered surface 324 of the gasket 320 is located radially outside the annular groove 321 and inclined from the axial direction of the gasket 320 (the Y-axis direction) to have smaller diameters at larger distances from a proximal end of the second tapered surface 324 in the axial direction (the Y-axis direction).

Under the conditions where the tubular body 111, the gasket 320, and the conversion adapter 260 are separated from each other, the first tapered surfaces 313, 323, and 363 may have the same inclination or different inclination angles, and the second tapered surfaces 314, 324, and 364 may have the same inclination or different inclination angles. As shown in FIG. 7, under the conditions where the tubular body 111, the gasket 320, and the conversion adapter 260 are connected to each other by the intermediate nut 200, the first tapered surfaces 313, 323, and 363 have the same inclination, and the second tapered surfaces 314, 324, and 364 have the same inclination. This is because pressure P6 is applied from the first tapered surfaces 323 of the gasket 320 to the first tapered surface 313 of the tubular body 111 and the first tapered surface 363 of the conversion adapter 260, and pressure P7 is applied from the second tapered surfaces 324 of the gasket 320 to the second tapered surface 314 of the tubular body 111 and the second tapered surface 364 of the conversion adapter 260. Pressures P6, P7 and their reactions cause the first tapered surfaces 313, 323, and 363 to press against and make contact with each other without any spaces therebetween, and the second tapered surfaces 314, 324, and 364 to press against and make contact with each other without any spaces therebetween. This tightly seals spaces among the tubular body 111, the gasket 320, and the conversion adapter 260.

Similarly, the first peripheral wall end portion 171 of the sleeve 170 may have an annular groove instead of the annular protrusion 174, and the second peripheral wall end portion 162 of the conversion adapter 260 may have an annular protrusion instead of the annular groove 166. A similar modification can be applied to the sealing structure between the tubular body 111 and the conversion adapter 160 shown in FIG. 4.

Figure 8:
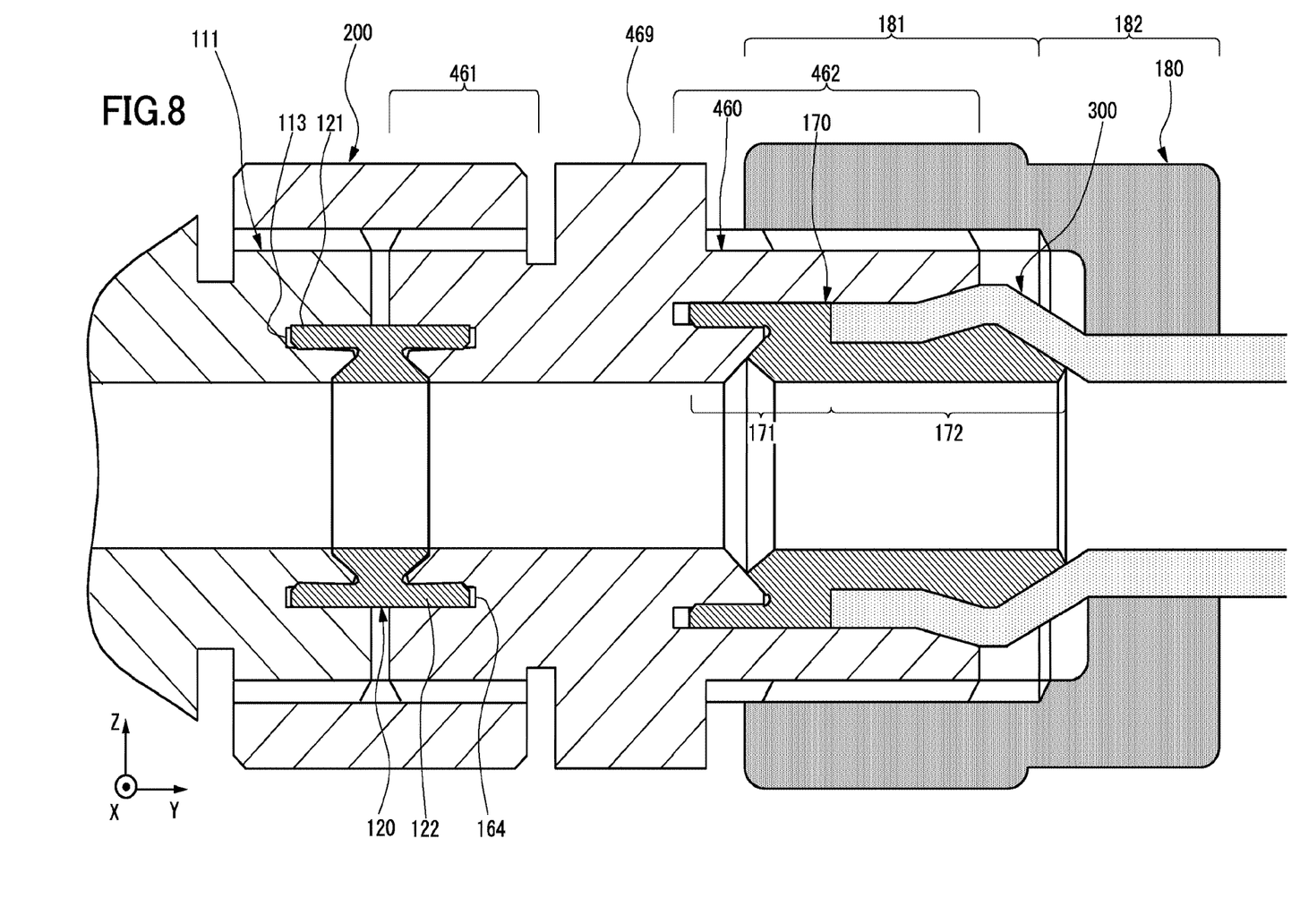
FIG. 8 is a vertical cross-section view of a modification of the conversion adapter in FIG. 6.

(6) FIG. 8 is a vertical cross-section view of a modification 460 of the conversion adapter 260 in FIG. 6. This conversion adapter 460 is different from the conversion adapter 260 in FIG. 6 only in including a flange 469 between a first peripheral wall end portion 461 and a second peripheral wall end portion 462. The flange 469 is an annular protrusion radially extending from an outer periphery of the conversion adapter 460 and has an outer periphery flat in the axial direction (the Y-axis direction). By bringing fingers in contact with the flange 469 and holding the conversion adapter 460, a user can easily screw the first peripheral wall end portion 461 into the intermediate nut 200. The flange 469 may be arranged, instead of between the first peripheral wall end portion 461 and the second peripheral wall end portion 462, to overlap at least one of the first peripheral wall end portion 261 and the second peripheral wall end portion 262 shown in FIG. 6.

(7) Resin material of the fittings 100 and 150 according to the above-described embodiments of the invention is not limited to fluoropolymers. Alternatively, various polymers such as polyethylene, polypropylene, polycarbonate, polyamide, polyacetal, polyether ether ketone, polyphenylene sulfide, and polyimide are available. These can be selected appropriately depending on fields where the fittings 100 and 150 are used, applications of the fittings 100 and 150, material of the tube 300, or the like.

(8) The fittings 100 and 150 according to the above-described embodiments of the invention may serve as members to connect pipes and devices, not only within equipment for manufacturing semiconductor, liquid-crystal, or organic electroluminescent devices, but also in piping systems of various plants, piping systems used in medical/pharmaceutical fields, and the likes.

What is claimed is:
1. A fitting for connecting a tube to an opening portion of a device, comprising:
a tubular body provided coaxially around the opening portion of the device and including a peripheral wall end portion having an externally threaded portion;

a gasket located at the peripheral wall end portion of the tubular body and including an annular protrusion axially projecting from an axial end surface of the gasket;

an annular conversion adapter including:
 a first peripheral wall end portion configured to be connected to the peripheral wall end portion of the tubular body across the gasket, the first peripheral wall end portion having
 a circumferential, annular groove formed on an axial end surface of the conversion adapter and configured to allow the annular protrusion of the gasket to be press-fitted thereinto, and
 an externally threaded portion;
and
a second peripheral wall end portion having an externally threaded portion;

a sleeve including:
 a first peripheral wall end portion configured to be connected to the second peripheral wall end portion of the conversion adapter; and
 a second peripheral wall end portion configured to be pressed into an open end of the tube;

an intermediate nut including:
 a first internally threaded portion configured to be screwed into the externally threaded portion of the tubular body; and
 a second internally threaded portion configured to be screwed into the externally threaded portion of the first peripheral wall end portion of the conversion adapter, wherein one of the first internally threaded portion and the second internally threaded portion is a right-handed thread and the other thereof is a left-handed thread;
and a nut configured to allow the tube to be inserted thereinto and to allow the externally threaded portion of the second peripheral wall end portion of the conversion adapter to be screwed thereinto.

2. A fitting for connecting a tube to an opening portion of a device, comprising:
 a tubular body provided coaxially around the opening portion of the device and including a peripheral wall end portion having an externally threaded portion;
 a gasket located at the peripheral wall end portion of the tubular body and including a circumferential, annular groove on an axial end surface of the gasket;
 an annular conversion adapter including:
  a first peripheral wall end portion configured to be connected to the peripheral wall end portion of the tubular body across the gasket, the first peripheral wall end portion having
  an annular protrusion axially projecting from an axial end surface of the conversion adapter to be press-fitted into the annular groove of the gasket, and
  an externally threaded portion;
 and
 a second peripheral wall end portion having an externally threaded portion;
 a sleeve including:
  a first peripheral wall end portion configured to be connected to the second peripheral wall end portion of the conversion adapter; and
  a second peripheral wall end portion configured to be pressed into an open end of the tube;
 an intermediate nut including:
  a first internally threaded portion configured to be screwed into the externally threaded portion of the tubular body; and
  a second internally threaded portion configured to be screwed into the externally threaded portion of the first peripheral wall end portion of the conversion adapter, wherein one of the first internally threaded portion and the second internally threaded portion is a right-handed thread and the other thereof is a left-handed thread;
 and
 a nut configured to allow the tube to be inserted thereinto and to allow the externally threaded portion of the second peripheral wall end portion of the conversion adapter to be screwed thereinto.

3. A fitting for connecting a tube to an opening portion of a device, comprising:
 a tubular body provided coaxially around the opening portion of the device;
 a gasket located at a peripheral wall end portion of the tubular body and including an annular protrusion axially projecting from an axial end surface of the gasket;
 a conversion adapter including:
  a first peripheral wall end portion configured to be connected to the tubular body across a gasket, including:
   a circumferential, annular groove formed on an axial end surface and configured to allow the annular protrusion of the gasket to be press-fitted thereinto; and
   an internally threaded portion configured to allow an externally threaded portion in a peripheral wall end portion of the tubular body to be screwed thereinto;
  and
  a second peripheral wall end portion including an externally threaded portion, wherein one of the internally threaded portion and the externally threaded portion is a right-hand thread and the other thereof is a left-hand thread;
 a sleeve including:
  a first peripheral wall end portion configured to be connected to the second peripheral wall end portion of the conversion adapter; and
  a second peripheral wall end portion configured to be pressed into an open end of the tube,
 and
 a nut configured to allow the tube to be inserted thereinto and to allow the externally threaded portion of the conversion adapter to be screwed thereinto.

4. A fitting for connecting a tube to an opening portion of a device, comprising:
 a tubular body provided coaxially around the opening portion of the device;
 a gasket located at a peripheral wall end portion of the tubular body and including a circumferential, annular groove on an axial end surface of the gasket;
 a conversion adapter including
  a first peripheral wall end portion configured to be connected to the tubular body across the gasket, including:
   an annular protrusion axially projecting from an axial end surface of the first peripheral wall to be press-fitted into the annular groove of the gasket; and
   an internally threaded portion configured to allow an externally threaded portion in a peripheral wall end portion of the tubular body to be screwed thereinto;
 and
  a second peripheral wall end portion including an externally threaded portion, wherein one of the internally threaded portion and the externally threaded portion is a right-handed thread and the other thereof is a left-handed thread;
a sleeve including:
   a first peripheral wall end portion configured to be connected to the second peripheral wall end portion of the conversion adapter; and
   a second peripheral wall end portion configured to be pressed into an open end of the tube,
and
a nut configured to allow the tube to be inserted thereinto and to allow the externally threaded portion of the conversion adapter to be screwed thereinto.

* * * * *